United States Patent
Hamer et al.

(10) Patent No.: US 11,187,814 B2
(45) Date of Patent: Nov. 30, 2021

(54) METHOD AND DEVICE FOR INCREASING THE ACCURACY OF LOCALIZATION

(71) Applicant: Continental Automotive GmbH, Hannover (DE)

(72) Inventors: Henning Hamer, Munich (DE); Karsten Mattmüller, Burglengenfeld (DE); Helmut Hamperl, Cham (DE); Karn Holger, Tournefeuille (FR)

(73) Assignee: Continental Automotive GmbH, Hannover (DE)

( * ) Notice: Subject to any disclaimer, the term of this patent is extended or adjusted under 35 U.S.C. 154(b) by 25 days.

(21) Appl. No.: 16/517,120

(22) Filed: Jul. 19, 2019

(65) Prior Publication Data

US 2020/0025945 A1     Jan. 23, 2020

(30) Foreign Application Priority Data

Jul. 20, 2018  (DE) ...................... 10 2018 212 133.8

(51) Int. Cl.
   *G06K 9/00*     (2006.01)
   *G01S 19/48*    (2010.01)
   (Continued)

(52) U.S. Cl.
   CPC .............. *G01S 19/48* (2013.01); *G01C 11/06* (2013.01); *G01C 21/3602* (2013.01); *G06T 7/70* (2017.01); *G06T 2207/30252* (2013.01)

(58) Field of Classification Search
   None
   See application file for complete search history.

(56) References Cited

U.S. PATENT DOCUMENTS

| 9,103,671 B1 | 8/2015 | Breed et al. |
| 2008/0154504 A1 | 6/2008 | Hein et al. |

(Continued)

FOREIGN PATENT DOCUMENTS

| DE | 102011117809 A1 | 5/2012 |
| DE | 102017129501 A1 | 6/2018 |
| WO | 2017/025600 A1 | 2/2017 |

OTHER PUBLICATIONS

Department of Defense USA; Global Positioning System Standard Positioning Service Performance Standard; 4th Edition, Sep. 2008, Department of Defense.

(Continued)

*Primary Examiner* — Soo Jin Park

(57) ABSTRACT

A method and a device for increasing the accuracy of localization. The method includes the following steps: a) detecting a selected object in an environment, using a camera of a first vehicle; b) estimating a first position of the selected object, wherein a first program uses first location coordinates of the first vehicle and a first distance estimate to the selected object; c) transferring an attribute of the selected object, the first location coordinates and the first distance estimate to a server; d) carrying out the steps a) to c) for a second vehicle; e) calculating a third position of the selected object by the server, wherein a third program performs an averaging of the plurality of location coordinates and distance estimates; f) using the third position of the selected object as a reference position for increasing the accuracy of a localization of a third vehicle.

3 Claims, 2 Drawing Sheets

(51) Int. Cl.
*G06T 7/70* (2017.01)
*G01C 11/06* (2006.01)
*G01C 21/36* (2006.01)

(56) References Cited

U.S. PATENT DOCUMENTS

| | | |
|---|---|---|
| 2017/0008521 A1* | 1/2017 | Braunstein ............ B60W 40/06 |
| 2018/0045519 A1 | 2/2018 | Ghadiok et al. |
| 2018/0151071 A1 | 5/2018 | Park et al. |
| 2018/0164833 A1 | 6/2018 | Miller et al. |

OTHER PUBLICATIONS

European Search Report dated Dec. 6, 2019 from corresponding European Patent Application No. 19176313.5.

* cited by examiner

METHOD AND DEVICE FOR INCREASING THE ACCURACY OF LOCALIZATION

BACKGROUND

The invention relates to a method and a device for localization, in particular for increasing the accuracy of localization, as well as a usage, a program element and a computer-readable medium.

In many cases, navigation systems are used to determine position. These are available either as individual devices (so-called "handhelds") or they are installed in a vehicle. In many cases, navigation systems use information sent by satellites. A family of navigation systems uses the so-called "GPS" system (GPS: Global Positioning System). It should be pointed out that, within the context of the present invention, GPS is representative of all global navigation satellite systems (GNSS), such as e.g. GPS, Galileo, GLONASS (Russia), Compass (China), IRNSS (India), Beidou or others.

For various reasons the information received from the satellites is in many cases inaccurate. This inaccuracy leads in many cases, under exclusive use of the signals from the satellites, to a deviation of several meters in the position determined by the navigation systems from the actual position of an object and/or its own position. This accuracy is inadequate for a range of applications.

BRIEF SUMMARY

The object of the present invention is to improve the accuracy of localization, at least in part.

Said object is achieved by means of the subject matter of the independent patent claims. Further refinements of the invention will emerge from the dependent claims and the following description.

A method for increasing the accuracy of localization comprises the following steps:

a) detecting a selected object in an environment, using a camera of a first vehicle.

An environment is understood to mean a real environment, in which objects are arranged and in which, for example, persons or vehicles can move freely. Certain objects can be selected. These selected objects can be, e.g., static landmarks, such as churches, towers, castles, bridges (e.g. for boats), or other topographical objects. Selected objects can also be, for example, traffic signs or traffic islands.

The recording of a selected object is carried out using a camera. For this, for example, mono, stereo or surround-view cameras can be used. The camera or cameras can be positioned on the vehicle. The vehicle is, for example, a motor vehicle, such as an automobile, a bus or a truck, or else a rail vehicle, a ship, an aircraft, such as a helicopter or an airplane, or for example a bicycle. In one embodiment it can also be a pedestrian or, in another embodiment, a stationary support for a camera.

b) Estimating a first position of the selected object, by means of a first program for localization, in the first vehicle. The first program uses first location coordinates of the first vehicle and a first distance estimate to the selected object.

The positions are described in particular in WGS-94 coordinates (WGS-94: World Geodetic System 1894). The first position in this step is estimated by means of a first program for localization. The first program can be an existing program, which in some vehicles—for different uses—may already be available as standard in the vehicle, or else it can be retrofitted and/or adjusted on a regular basis. The program can consist of a vehicle-specific algorithm. To estimate the first position of the selected object the first program determines, for example in an intermediate step, at least first location coordinates of the first vehicle and a first distance estimate. The first location coordinates may have been calculated, for example, using standard GPS, e.g. if information from the GPS system is used. These location coordinates can be affected by serious inaccuracy, so that for many purposes they are not usable directly. The distance estimate to the selected object can be carried out by the first program, for example by means of triangulation and using a stereo camera. The calculation by means of the first program can be carried out in a computing device in the vehicle, but also on a server that receives the data from the first vehicle. The location coordinates refer to a defined point on or in the first vehicle, e.g. to the wing mirror on the driver's side.

Therefore, after this step at least the following items of information are available:

One or more attributes of the selected object, e.g., "STOP sign in the XY-road" or "eastern side of the middle bridge pillar".

Location coordinates of the first vehicle, such as the "Raw GPS" data of the first vehicle at the time of measurement.

A first distance estimate between the first vehicle and the selected object. Either two- or three-dimensional data are provided. These data can be, for example, Cartesian or polar coordinates.

c) Transferring an attribute of the selected object, the first location coordinates and the first distance estimate to a server.

The transfer of these data can be carried out via wireless means, but they can also, for example, be read out from a memory of the vehicle via a service interface. Suitable technologies for the transfer are direct communication links, such as WLAN (e.g. WLAN 802.11a/b/g/n or WLAN 802.11p), ZigBee or WiMax, or cellular radio systems such as GPRS, UMTS or LTE. It is also possible to use other transmission protocols. The specified protocols provide the advantage of the standardization which has already taken place.

d) Carrying out the steps a) to c) for the selected object, to estimate a second position of the selected object, using a camera of a second vehicle, by means of a second program for localization, using second location coordinates and a second distance estimate.

The steps a) to c) are also carried out for the selected object, mutatis mutandis, by a second vehicle. The second vehicle can be, for example, a different second vehicle, it may be the first vehicle that is newly located at a specific position, from which the camera can capture the selected object; the second vehicle can also be a plurality of vehicles, which capture the selected object by means of a camera. In one embodiment, the camera can be arranged to be stationary at a defined distance from the selected object. The second program for localization can be identical to the first program, or else it can be a completely different program, which supplies the same kind of results as the first program. After the step d) therefore, the data of an attribute of the selected object, the second location coordinates and the second distance estimate are available, and these are transferred to the server.

e) Calculating a third position of the selected object by the server, by means of a third program, using an attribute of the selected object, the first location coordinates and the first distance estimate, the second location coordinates and the second distance estimate. The third program also performs an averaging of the plurality of location coordinates and distance estimates.

The averaging of the plurality of location coordinates can use, for example, the arithmetic mean or the weighted arithmetic mean. In many cases the first program and the second program are not very time-consuming or computationally intensive. This may be attributable to the fact that these programs must at least satisfy soft real-time requirements. This can be attributable to the fact that in many cases the computing capacity in vehicles, e.g. due to energy or cost reasons, is limited. The third program, on the other hand, can be significantly time- and/or computation-intensive, because for this program it is not so important that its results are delivered quickly; instead, a high accuracy of the results is sought. The result of the third program includes at least the third position of the selected object.

f) Using the third position of the selected object as a reference position for increasing the accuracy of a localization of a third vehicle.

If the third position is available, then this can be used as a reference position by the third vehicle (or else e.g. by handheld devices) to increase the accuracy of localization. This is an advantageous feature, in particular because using the method described above a larger number of reference positions are available, so that a correction of the localization—for example, on the basis of "raw GPS" data—can be performed in a relatively fine-grained manner, so that at any point of an area prepared in such a way the deviation is not very great. The reference positions also do not need to be defined and marked on site involving a high degree of effort, but can be, for example, determined or calculated at a central location, by using the third program. Furthermore, the number of the reference positions can be continuously extended, so that the correction can become more fine-grained over time. In particular because of the small amount of preparation effort and because the computing power is not time-critical—and therefore can be distributed over a longer time span—this method is also quite cost-effective.

In one embodiment, step c*) is inserted after step c), with: c*) Replacement, on the server, of the first location coordinates and the second location coordinates, by means of a fourth program, using corrected first location coordinates and corrected second location coordinates. The fourth program can use, for example, raw GPS data, so as to determine more accurate data for the corrected first and corrected second location coordinates. In this embodiment the steps a) to c*) are carried out in step d).

In one embodiment, step e) is replaced by e*), with: e*) Calculation of a third position of the selected object, wherein the third program calculates a centre of gravity of the plurality of location coordinates and distance estimates.

The centre of gravity of the plurality of location coordinates and distance estimates is thus the center of a point cloud, containing either the total number of location coordinates and distance estimates or the total number of location coordinates and the total number of distance estimates.

In one embodiment, step f) is replaced by f*), with f*) correction of the first location coordinates of the first vehicle and the second location coordinates of the second vehicle using a fourth position of the selected object. In doing so, the fourth position of the selected object is retrieved from a database.

If the fourth position of the selected object is available with high accuracy, i.e., for example, it can be obtained from a database, then the first location coordinates of the first vehicle and the second location coordinates of the second vehicle can be corrected in such a way that they form, for example, the difference between the position of the selected object calculated in the vehicles and the fourth position of the selected object. This difference can be calculated at a point where the camera captures the selected object.

In one embodiment the selected object is, for example, a static landmark, such as a church, a tower, a castle, a bridge (e.g. for boats), or another topographical object. In one embodiment the selected object is a traffic sign or a traffic island.

These selected objects can also be exchanged between different mapping and/or navigation systems.

In one embodiment, the location coordinates are determined using raw GPS. In particular, this can take place in an environment in which GPS is particularly suitable for use in navigation systems.

In one embodiment, the position is specified in WGS-94 coordinates. This is based on the "World Geodetic System 1894" platform.

The invention also comprises a device for increasing the accuracy of localization in a vehicle, which comprises a computation and control device which is configured to carry out one of the methods described above.

The invention also comprises a program element, which, if it is executed on a computation and control device, is suitable for carrying out the method described above.

The invention further comprises a computer-readable medium on which the program element is stored.

The invention comprises the use of a device or a method as described above for increasing the accuracy of localization in a navigation system, in particular in a vehicle.

BRIEF DESCRIPTION OF THE DRAWINGS

For further clarification, the invention will now be described on the basis of an embodiments shown in the figures. These embodiments are to be understood merely as examples and not as limitations.

The figures show.

DETAILED DESCRIPTION

Figure 1:
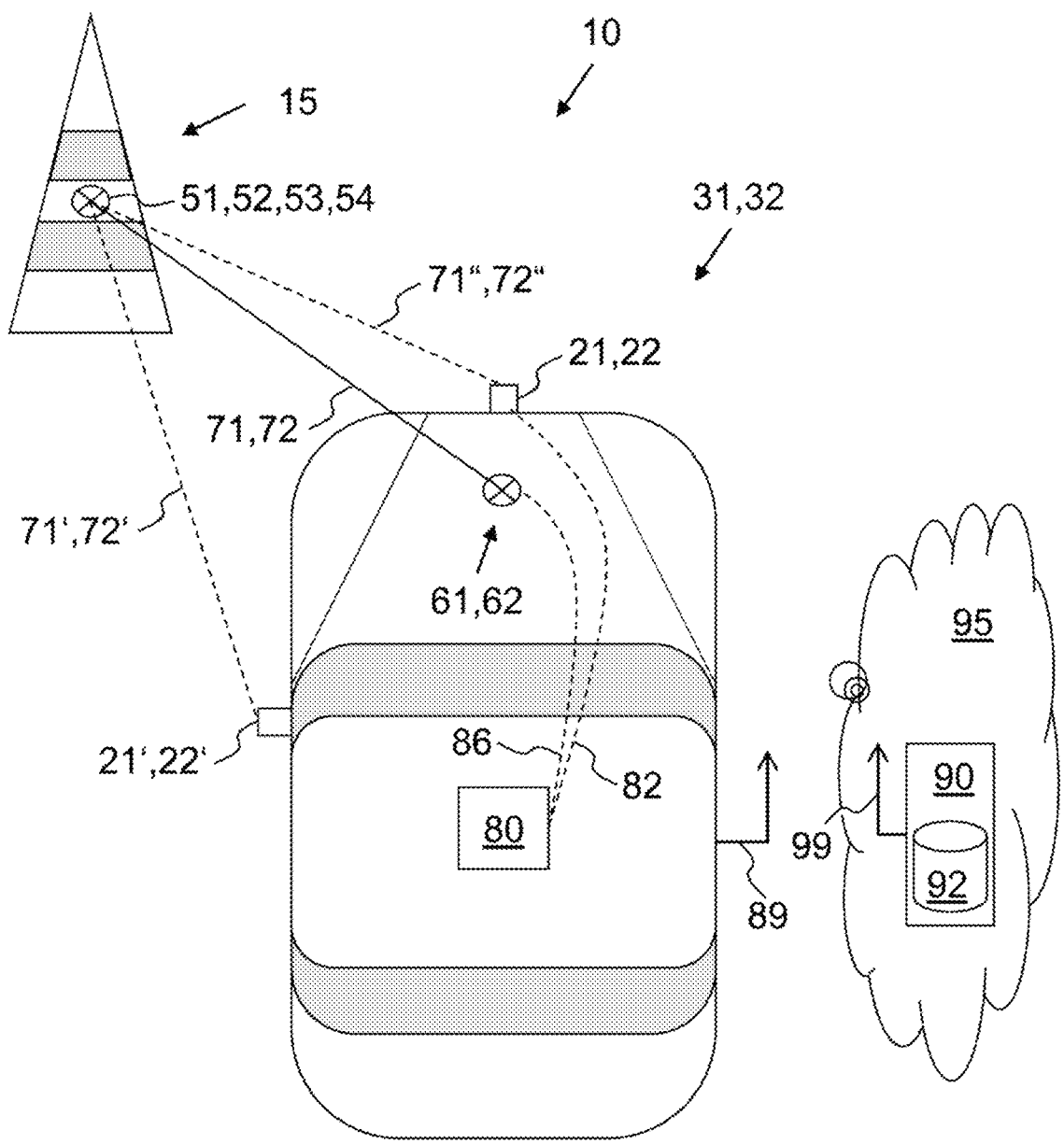
FIG. 1: an example scenario, in which a vehicle detects a selected object.

FIG. 1 shows a vehicle 31, 32, which detects a selected object 15 in an environment 10. The vehicle can be a first vehicle 31 or a second vehicle 32. The vehicle has two cameras: 21 and 21' are arranged on the first vehicle, 22 and 22' on the second vehicle. These can be configured as a stereo camera. Each of the vehicles 31, 32 detects the selected object 15, using its own location coordinates 61 or 62. The reference point can be, for example, the left-hand wing mirror or else the camera 21' or 22'. Further, the first vehicle 31 performs a triangulation. In doing so the location 71' determined by the camera 21', is coordinated with the location 71" determined by the camera 21, and, by means of a first program, a first distance estimate 71 is calculated. The second vehicle 32 calculates a second distance estimate 72, by means of the cameras 22 and 22' and a second program. In one embodiment the first and the second program can be the same program. The co-ordination of GPS and cameras takes place via the computation and control device 80, which is connected via the interfaces 86 and 82 to the GPS navigation system and the cameras (for the sake of simplicity, only one symbol and one reference sign is used, which are intended to apply to each vehicle). The computation device 80 can also execute the first or the second program.

Each of the vehicles 31, 32 (and, in reality, also a plurality of other vehicles) transmits these data, together with an attribute of the selected object 15, to the server 90, over the wireless interfaces 89 and 99. The server 90 can be arranged in a cloud 95. The server 90 calculates, on this basis, a third position 53 of the selected object 15, which it stores in the database 92. In one embodiment a fourth position 54 is already stored in the database 92. Other vehicles can then use the position 53 or 54 as a reference position for increasing the accuracy of their determined location. In one embodiment, the positions 53 or 54 are reviewed continuously or at selectable intervals, so that changes—for example, removal or movement of the selected object 15—can be dynamically taken into account.

Figure 2:
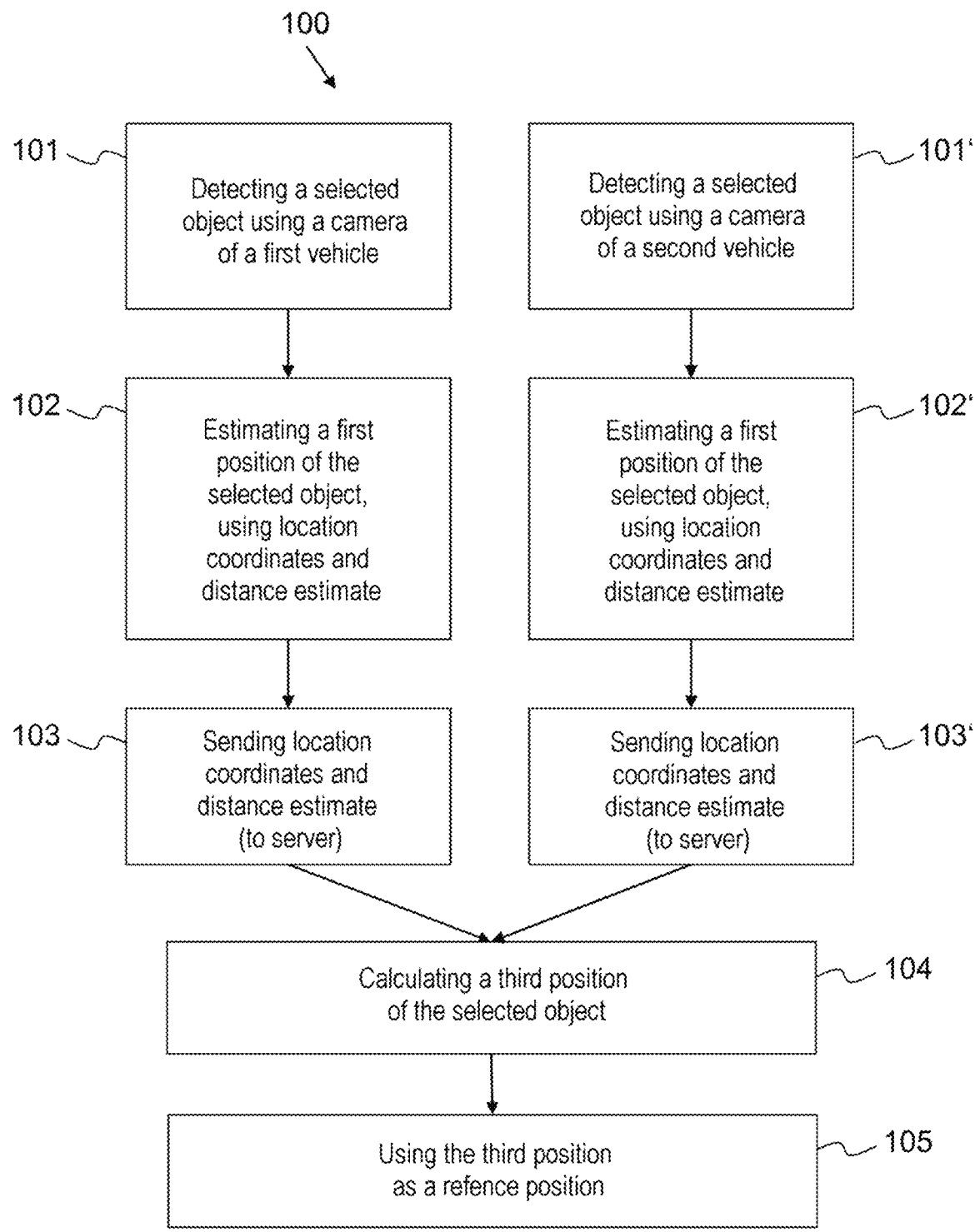
FIG. 2: a method for increasing the accuracy of localization.

FIG. 2 illustrates a method 100 for increasing the accuracy of localization. In Step 101 a selected object 15 is detected by means of a camera 21 of a first vehicle 31. In step 102, a first position 51 of the selected object 15 is calculated, by means of first location coordinates 61 and a first distance estimate 71, using a first program. In step 103, the first location coordinates 61 and the first distance estimate 71 are transmitted or sent to the server 90.

In steps 101', 102' and 103', similar actions to those in steps 101, 102 and 103 are carried out, but for a second vehicle 32 or for a plurality of vehicles 32. In step 104, the location coordinates 61, 62 and distance estimates 71, 72 in the server 90 are merged and the result is used to calculate the third position 53 of the selected object 15. In step 104, the third position 53 is used as a reference position. This can be carried out by any of the vehicles which use a list of the selected objects 15 and the method described here.

LIST OF REFERENCE NUMERALS 10 environment
15 selected object
21, 22 camera
31, 32 first and second vehicle
61, 62 first and second location coordinates
61', 62' corrected first and second location coordinates
71, 72 first and second distance estimate
71', 71", 72', 72" determined locations
80 computation and control device
82 interface to the camera
86 interface to the position device
89 wireless interface of the vehicle
90 server
92 database
95 cloud
99 wireless interface of the server
100 method
101 . . . 105 steps

The invention claimed is:

1. A device for increasing the accuracy of localization in a vehicle, which comprises a computation and control device, which is configured to perform operations comprising:
   a) detecting a selected object in an environment, using a camera of a first vehicle;
   b) estimating a first position of the selected object, by means of a first program for localization, in the first vehicle,
   wherein the first program uses first location coordinates of the first vehicle and a first distance estimate to the selected object;
   c) transferring an attribute of the selected object, the first location coordinates, and the first distance estimate to a server;
   d) carrying out the steps a) to c) for the selected object, to estimate a second position of the selected object, using a camera of a second vehicle, by means of a second program for localization, using second location coordinates and a second distance estimate;
   e) replacement, on the server, of the first location coordinates and the second location coordinates, by means of a fourth program, using corrected first location coordinates and corrected second location coordinates,
   wherein the fourth program uses raw Global Positioning System data to determine more accurate data for the corrected first location coordinates and the corrected second location coordinates;
   f) calculating a third position of the selected object by the server, by means of a third program, using the corrected first location coordinates and the corrected second location coordinates,
   wherein the third program performs an averaging of the corrected first location coordinates and the corrected second location coordinates; and
   g) using the third position of the selected object as a reference position for increasing the accuracy of a localization of a third vehicle.

2. The device as claimed in claim 1, wherein the selected object is a static landmark or a traffic sign.

3. The device as claimed in claim 2, wherein the position is specified in WGS 94 coordinates.

* * * * *

UNITED STATES PATENT AND TRADEMARK OFFICE
CERTIFICATE OF CORRECTION

| | | |
|---|---|---|
| PATENT NO. | : 11,187,814 B2 | Page 1 of 1 |
| APPLICATION NO. | : 16/517120 | |
| DATED | : November 30, 2021 | |
| INVENTOR(S) | : Henning Hamer et al. | |

It is certified that error appears in the above-identified patent and that said Letters Patent is hereby corrected as shown below:

On the Title Page
Item [72] INVENTORS.
Line 4, change "Karn Holger" to --Holger Karn--.

Signed and Sealed this
Thirty-first Day of May, 2022

Katherine Kelly Vidal
*Director of the United States Patent and Trademark Office*